Figure 1:
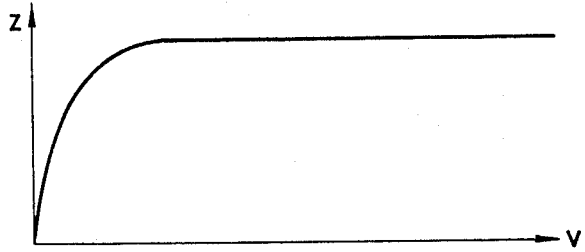

March 15, 1960  A. R. VAN CORTLANDT WARRINGTON  2,929,003
ELECTRICAL RELAYS
Filed Oct. 4, 1957                                2 Sheets-Sheet 1

Inventor:
Albert Russell van Cortlandt Warrington
By Stevens, Davis, Miller & Mosher
Attorneys United States Patent Office 2,929,003
Patented Mar. 15, 1960

2,929,003

ELECTRICAL RELAYS

Albert Russell van Cortlandt Warrington, Stafford, England, assignor to The English Electric Company Limited, London, England, a company of Great Britain Application October 4, 1957, Serial No. 688,216

11 Claims. (Cl. 317—188)

This invention relates to electrical relays of the kind which respond to the difference between two opposing forces applied to an electro-conductive armature by separate magnet systems, one such force being produced in accordance with an input current and the other such force being produced in accordance with an input voltage. The magnet system producing the first said force will be referred to hereinafter as the "current-energized" magnet and that producing the second force will be referred to as the "voltage-energized" magnet.

According to a feature of the invention, an electrical protective relay comprises two separate magnet systems, one having a current energizing winding to enable it to be energized in accordance with the current in a protected circuit, and the other having a voltage energizing winding to enable it to be energized in accordance with the voltage in a protected circuit, an electro-conductive armature arranged to respond to the difference between opposing forces applied to it by said magnet systems, the current energized magnet system serving to produce a force on the armature in the relay operating direction and the voltage energized magnet system serving to produce a force on the armature in the relay restraining direction, and a magnetically-saturable inductive element incorporaed in effective series connection with said voltage energizing winding.

According to another feature of the invention, an electrical protective relay comprises two separate magnet systems, one having a current energizing winding to enable it to be energized in accordance with the current in a protected circuit, and the other having a voltage energizing winding to enable it to be energized in accordance with the voltage in a protected circuit, an electro-conductive armature arranged to respond to the difference between opposing forces applied to it by said magnet systems, the current energized magnet system serving to produce a force on the armature in the relay operating direction and the voltage energized magnet system serving to produce a force on the armature in the relay restraining direction, and a magnetically-saturable inductive element incorporated in effective parallel connection with said current energizing winding.

By "effective series connection" is meant either in actual series connection, or, bearing in mind the equivalence of inductively-coupled circuits in electrically-equivalent series connection. Thus a saturable magnetic leakage path may be provided around the winding on the "voltage-energized" magnet and this will be equivalent to a saturable inductive element connected in series with the winding.

Similarly, by "effective parallel connection" is meant either an actual parallel connection or an electrically equivalent parallel connection. Thus a saturable-magnetic circuit may form a part of the main magnetic circuit of the "current-energized magnet."

Features of the invention comprise the provision of said magnetically-saturable elements by using laminations having a high permeability together with laminations having a relatively low permeability for the assembly of a laminated magnet structure and a method of adjusting the effect of these elements by providing individual short-circuit paths around the high permeability laminations.

Figure 2:
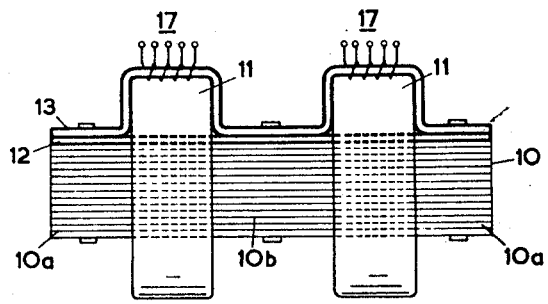
Figure 3:
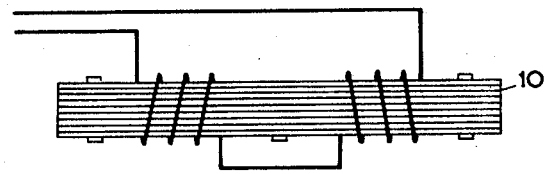
Figure 4:
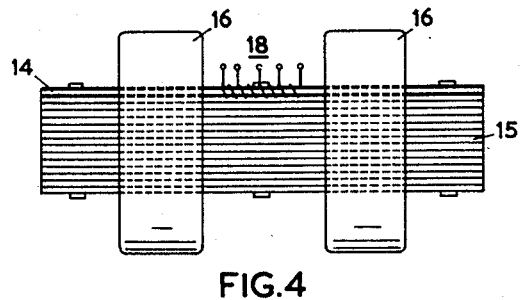
Figure 5:
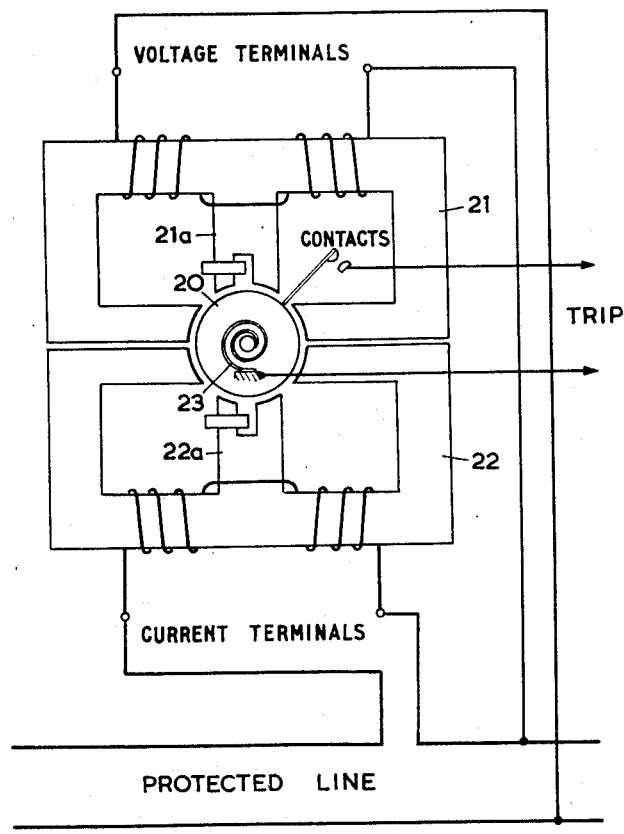

The invention will now be described with reference to the accompanying drawing in which:

Fig. 1 depicts the characteristic of a mho-type relay, Fig. 2 illustrates the construction of a "voltage-energized" magnet, according to the invention, Fig. 3 illustrates the electrical connections of the energizing coils of the magnet, shown in Fig. 2, Fig. 4 illustrates a "current energized" magnet embodying the invention, and Fig. 5 illustrates an induction-cylinder relay unit and shows how the magnets of Figs. 2 and 4 may be used in a relay.

The invention may find application in a protective relay having a mho-type characteristic. In such a relay as shown in Fig. 5, an electroconductive cup-type armature 20 is influenced by two shaded-pole magnet systems 21 and 22. The system 22 is energized by a coil carrying current proportional to that in a protected line and the other system 21 is energized by a coil having a voltage applied to it, which is proportional to that of the protected line. In such systems, it is necessary to provide a form of mechanical restraint which will bias the armature and enable the relay to reset when a fault is cleared from the line. Usually, this mechanical restraint is provided by a small spring (shown schematically at 23) and for normal line voltages the magnetic restraint force is provided by the "voltage-energized" magnet. The magnetic force varies as the square of the applied voltage and if, at a particular voltage, the magnetic restraint force is, say, 100 times greater than the mechanical restraint force then at one tenth of this voltage they will be equal. This means that whereas over a wide range of voltage variation the relay will operate when the line impedance falls below a particular fixed value, at small values the impedance will have to fall much lower than this value to cause the relay to operate.

The permeability of a magnetic core increases initially as the applied field strength increases. Consequently, when the current energizing the "current-energized" magnet is small, the ratio relating magnetic flux and current is reduced below a normal value. Thus the operating torque of the relay is reduced at low currents. The combined effects of the mechanical restraint and this variation of permeability produce a relay characteristic which has the form shown in Fig. 1. In Fig. 1 a relationship between line impedance Z and line voltage V is shown. The relationship corresponds to a constant value of Z over a wide range of V, but when V is small the value of Z falls and when V is zero Z is zero. For the relay to operate the value of Z at a particular value of V must fall below that represented by the curve in Fig. 1.

It is desirable for the range over which Z is constant to extend as closely as possible to $V=0$. This may be done by rendering the sensitivities of the "current-energized" magnet and/or the "voltage-energized" magnet non-linear. Thus it has been proposed to introduce a non-linear resistance in the voltage-restraining circuit in order to reduce magnetic restraint at low voltages. This compensates for the relatively-important effect of the mechanical restraint. This latter proposal suffers from certain disadvantages and the present invention provides an alternative which overcomes some of these disadvantages.

There are two alternative approaches to the problem. Firstly, the "voltage-energized" magnet can be desensitized at low voltages. Secondly, the "current-energized" magnet can have its torque increased at low currents.

In Fig. 2 a "voltage-energized" magnet is shown in which there is provision for magnetic saturation so as to cause the magnet to be desensitized at low voltages. The magnet core 10 is of laminated construction and has two energizing coils 11 which are connected in series in the manner illustrated in Fig. 3. When current flows through this winding a flux is produced which comprises two flux components passing respectively through side limbs 10a and the flux components combine and pass down the centre limb 10b. The outside lamination 12 on one side of the magnet 10 is made from a material having a magnetic permeability which is high relative to that of the other laminations of the core. Also bolted to the core adjacent this lamination there is an additional lamination 13 which is also made from a material having a high magnetic permeability and which passes around the outside of the coils 11 and forms local flux leakage paths around the coils. In operation, the flux which is effective in producing torque on an armature is added to that which flows around the leakage paths afforded by the laminations 12 and 13. This addition is effective in so far as the induced back E.M.F. in the windings 11 is concerned. The ratio between the effective flux and the E.M.F. will vary with the degree of saturation of the laminations 12 and 13. Thus when the applied voltage is small and the laminations 12 and 13 are not saturated the ratio between the effective flux and the voltage will be small. At high voltages, when the laminations 12 and 13 are saturated, the effective flux alone will produce the induced back E.M.F. and, consequently, the ratio between the effective flux and the applied E.M.F. will be correspondingly large. The result of this is to desensitize the magnet at low voltages. The laminations 12 and 13 combine to increase at low voltages the inductance of the windings 11 relative to the working flux across the gap in the voltage energized magnet core 10 and are effective as a magnetically saturable inductive element connected in series with the windings 11.

In the alternative form in which the "current-energized" magnet is desensitized at high voltages a single lamination 14 of high permeability material is bolted to the core 15 of the magnet, as shown in Fig. 4. In this case the magnet is energized by the coils 16. The lamination 14 in this case does not afford a magnetic leakage path for the coils 16. Instead, it forms an active part of the core 15. Thus at low currents the effective permeability of the whole core 15 is increased by the presence of the laminations 14. At high currents the lamination 14 is saturated and the lamination has no effect on the effective permeability of the core. The result of this is to increase the ratio between effective flux and applied current at low currents and this compensates for the decrease of permeability with decreasing field strength in the material of the core 15 and may also compensate for the adverse effects of the mechanical restraint mentioned above. The lamination 14 decreases at high currents the inductance of the windings 16 relative to the working flux across the gap in the current energized magnet core 15 and is effective as a magnetically saturable inductive element connected in parallel with the windings 16.

It will be appreciated that the two systems, as illustrated in Fig. 2 and Fig. 4 can be combined in a single relay.

In practice it is not possible to design a magnet utilizing a lamination of high permeability and laminations or relatively low permeability to give an exact compensation for the mechanical or magnetic effects which lead to an adverse characteristic. It is therefore preferable to over-compensate by using more high permeability material than is necessary. The effect of this high permeability material can then be toned down by providing an eddy-current path around the lamination of high permeability. Thus when the magnets shown in Fig. 2 or Fig. 4 are assembled a few turns of copper wire embracing the high permeability laminations may be introduced into the system and a variable resistor may be connected in the circuit. Alternatively, a series of turns of wire (shown diagrammatically in Figs. 2 and 4 at 17 and 18 respectively) may be incorporated in the magnet embracing the high permeability lamination and shorted in succession by twisting their ends together until the appropriate degree of compensation has been obtained.

It will be appreciated that though the "current energized" magnet shown in Fig. 4 has a high permeability lamination forming an outside lamination of the magnetic structure, more than one such lamination may be used and in this case it is preferable to interleave the high permeability laminations with the main laminations. The advantage of having the high permeability lamination as an outside lamination arises from the comparative ease with which the few turns of copper wire can be introduced around the high permeability lamination during assembly.

It is also to be noted that the two separate magnetic systems shown in Fig. 5 are each capable of applying a force to the armature 20 by virtue of the provision of the shaded poles denoted 21a and 22a in the figure. The relay core configuration and energization may have provision for a polarization as, for example, by the energization of the unshaded poles of the four-pole configuration shown in Fig. 5. In this case, as is well known in the art, the magnet systems 21 and 22 are effective in applying a torque to the armature 20 regardless of the presence of the shading rings on the poles 21a and 22a.

What I claim as my invention and desire to secure by Letters Patent is:

1. An electrical protective relay comprising two separately-cored magnet systems, one having a current energizing winding to enable it to be energized in accordance with the current in a protected circuit, and the other having a voltage energizing winding to enable it to be energized in accordance with the voltage in a protected circuit, an electro-conductive armature mounted to move between gaps in the working flux paths of the cores of both magnet systems to respond to the difference between opposing forces applied to it by said magnet systems, the current energized magnet system serving to produce a force on the armature in the relay operating direction and the voltage energized magnet system serving to produce a force on the armature in the relay restraining direction, and a magnetically-saturable inductive element incorporated in effective series connection with said voltage energizing winding, and adapted to saturate before the core of the magnet system having the voltage energizing winding.

2. An electrical protective relay according to claim 1, wherein the core of said voltage energized magnet is composed of laminations having a low magnetic permeability and said magnetically-saturable inductive element comprises at least one lamination having a high magnetic permeability and assembled with the core to be magnetized by said voltage energizing winding around a flux path which does not include the gap in the core, so that when a lamination having a high permeability becomes saturated the ratio of the working magnetic flux produced in said magnet with respect to the energizing voltage is greater than it is when the high permeability lamination is not saturated.

3. An electrical protective relay according to claim 2, wherein the saturating effect of the high permeability laminations is rendered adjustable by the provision of a short-circuiting winding around the high permeability laminations, the winding being tapped for use in conjunction with a short-circuiting connection by which it is adapted to permit the number of short-circuiting turns of the winding to be adjusted.

4. An electrical protective relay according to claim 1, wherein said voltage energizing winding embraces in addition to the core of its magnet system a magnetic circuit which has a high permeability and which is not traversed by the working flux of the magnet.

5. An electrical protective relay according to claim 4, wherein the saturating effect of the high permeability laminations is rendered adjustable by the provision of a short-circuiting winding around the high permeability laminations, the winding being tapped for use in conjunction with a short-circuiting connection by which it is adapted to permit the number of short-circuiting turns of the winding to be adjusted.

6. An electrical protective relay comprising two separately-cored magnet systems, one having a current energizing winding to enable it to be energized in accordance with the current in a protected circuit, and the other having a voltage energizing winding to enable it to be energized in accordance with the voltage in a protected circuit, an electro-conductive armature mounted to move between gaps in the working flux paths of the cores of both magnet systems to respond to the difference between opposing forces applied to it by said magnet systems, the current energized magnet system serving to produce a force on the armature in the relay operating direction and the voltage energized magnet system serving to produce a force on the armature in the relay restraining direction, and a magnetically-saturable inductive element incorporated in effective parallel connection with said current energizing winding, and adapted to saturate before the core of the magnet system having the current energizing winding.

7. An electrical protective relay according to claim 6, wherein the core of said current energized magnet is composed of laminations having a low magnetic permeability and said magnetically-saturable inductive element comprises at least one lamination having a high magnetic permeability and assembled with the core to be magnetized by said current energizing winding around a flux path which includes the gap in the core, so that when a lamination having a high permeability becomes saturated the ratio of the working magnetic flux produced in said magnet with respect to the energizing current is less than it is when the high permeability is not saturated.

8. An electrical protective relay according to claim 7, wherein the saturating effect of the high permeability laminations is rendered adjustable by the provision of a short-circuiting winding around the high permeability laminations, the winding being tapped for use in conjunction with a short-circuiting connection by which it is adapted to permit the number of short-circuiting turns of the winding to be adjusted.

9. An electrical protective relay according to claim 6, wherein said current energizing winding embraces in addition to the core of its magnet system a magnetic circuit which has a high permeability and which is traversed by the working flux of the magnet.

10. An electrical protective relay according to claim 9, wherein the saturating effect of the high permeability laminations is rendered adjustable by the provision of a short-circuiting winding around the high permeability laminations, the winding being tapped for use in conjunction with a short-circuiting connection by which it is adapted to permit the number of short-circuiting turns of the winding to be adjusted.

11. An electrical protective relay comprising two separately-cored magnet systems, one having a current energizing winding to enable it to be energized in accordance with the current in a protected circuit, and the other having a voltage energizing winding to enable it to be energized in accordance with the voltage in a protected circuit, an electro-conductive armature mounted to move between gaps in the working flux paths of the cores of both magnet systems to respond to the difference between opposing forces applied to it by said magnet systems, the current energized magnet system serving to produce a force on the armature in the relay operating direction and the voltage energized magnet system serving to produce a force on the armature in the relay restraining direction, and in combination two magnetically-saturable inductive elements, one being incorporated in effective series connection with said voltage energizing winding and adapted to saturate before the core of the magnet system having the voltage energizing winding and the other being incorporated in effective parallel connection with said current energizing winding and adapted to saturate before the core of the magnet system having the current energizing winding.

References Cited in the file of this patent

UNITED STATES PATENTS

| | | |
|---|---|---|
| 1,566,902 | Ciffrinowitsch | Dec. 22, 1925 |

FOREIGN PATENTS

| | | |
|---|---|---|
| 477,557 | Germany | June 10, 1929 |